(12) United States Patent
Suzuki et al.

(10) Patent No.: US 6,646,631 B2
(45) Date of Patent: *Nov. 11, 2003

(54) INPUT DEVICE

(75) Inventors: Katsutoshi Suzuki, Fukushima-ken (JP); Seiichi Suga, Fukushima-ken (JP); Masaru Komatsu, Fukushima-ken (JP)

(73) Assignee: Alps Electric Co., Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/360,819

(22) Filed: Jul. 26, 1999

(65) Prior Publication Data

US 2002/0122025 A1 Sep. 5, 2002

(30) Foreign Application Priority Data

Jul. 27, 1998 (JP) .............................. 10-211645

(51) Int. Cl.[7] ................................. G09G 5/08
(52) U.S. Cl. ..................... 345/157; 345/160; 345/163; 345/167; 400/479
(58) Field of Search ................ 345/161, 158, 345/160, 168; 341/20, 33, 22; 361/283.2; 73/718, 862.043; 318/488; 463/38; 200/6 A; 400/479

(56) References Cited

U.S. PATENT DOCUMENTS

| | | | | |
|---|---|---|---|---|
| 4,680,577 A | * | 7/1987 | Straayer et al. | 345/160 |
| 4,719,538 A | | 1/1988 | Cox | |
| 4,879,556 A | * | 11/1989 | Duimel | 341/20 |
| 5,006,952 A | * | 4/1991 | Thomas | 361/283.2 |
| 5,259,247 A | * | 11/1993 | Bantien | 73/718 |
| 5,343,765 A | * | 9/1994 | Okada | 73/862.043 |
| 5,383,735 A | * | 1/1995 | Smiley | 400/479 |
| 5,648,708 A | * | 7/1997 | Littlejohn | 318/488 |
| 5,689,285 A | * | 11/1997 | Asher | 345/161 |
| 5,754,166 A | * | 5/1998 | Baba | 341/22 |
| 5,847,694 A | * | 12/1998 | Redford et al. | 345/158 |
| 5,894,301 A | * | 4/1999 | Seffernick | 345/160 |
| 5,911,627 A | * | 6/1999 | Piot et al. | 463/38 |
| 5,949,354 A | * | 9/1999 | Chang | 341/33 |
| 5,966,117 A | * | 10/1999 | Seffernick et al. | 345/161 |
| 6,043,806 A | * | 3/2000 | Atwell | 345/161 |
| 6,094,191 A | * | 7/2000 | Watanabe et al. | 345/168 |
| 6,107,993 A | * | 8/2000 | DeVolpi | 345/161 |
| 6,115,030 A | * | 9/2000 | Berstis | 345/161 |
| 6,160,537 A | * | 12/2000 | Liu et al. | 345/161 |
| 6,184,865 B1 | * | 2/2001 | Zimmerman et al. | 345/160 |
| 6,201,196 B1 | * | 3/2001 | Wergen | 200/6 A |

* cited by examiner

Primary Examiner—Dennis-Doon Chow
Assistant Examiner—Uchendu O. Anyaso
(74) Attorney, Agent, or Firm—Brinks Hofer Gilson & Lione

(57) ABSTRACT

An input device which provides excellent operability and reaction to a user, and which can be easily operated. The device comprises a casing, an operation unit supported parallel-movably in a direction along one surface of the casing, having a member to return to an initial position when the operation unit is not operated, and a signal generation portion which detects moving direction and moving amount of the operation unit, and generates a control signal to control moving direction and moving amount of an object to be operated on an image display device, in accordance with the detected moving direction and moving amount.

1 Claim, 5 Drawing Sheets

INPUT DEVICE

BACKGROUND OF THE INVENTION

1. Field of the Invention

The present invention relates to an input device used in cursor position control or display operation and the like.

2. Description of the Related Art

As conventional pointing devices to move a cursor and the like, used in comparatively small machines such as a handheld personal computer, a flat-pad type touch controller provided around a keyboard and operated with a finger, and a stick provided upright in a position of a keyboard, are known.

The flat-pad type touch controller is constructed such that a cursor or the like is moved by sliding a finger on the pad. Since the pad itself does not move, the flat pad does not provide good in operability and reaction.

The stick, provided upright in a position of a keyboard, cannot be moved in any substantial amount. Accordingly, slight distortion caused by a force applied to the stick is detected, and a cursor or the like is moved based on the detected distortion. In this case, a user lack sufficient feeling of operation, reaction and feed back, thus the user may feel that the stick is rather difficult to operate.

SUMMARY OF THE INVENTION

In view of the above drawbacks, the present invention has its object to provide an input device that provides excellent operability and reaction to a user, and that can be easily operated.

According to the present invention, the foregoing object is attained by providing an input device comprising: a casing; an operation unit, supported to be movable in parallel in a direction along one surface of the casing, having means for returning to an initial position when the unit is not operated; and signal generation means for detecting moving direction and moving amount of the operation unit, and generating a control signal for controlling moving direction and moving amount of an object to be operated on an image display device, in accordance with the detected moving direction and moving amount of the operation unit.

That is, the operation unit to be operated with a finger is movable. The unit has means for returning to an initial position when the unit is not operated. An object to be operated on an image display device is moved in accordance with moving direction and moving amount of the operation unit. This construction provides an input device with excellent operability and reaction and which can be easily operated.

Preferably, the signal generation means has a plurality of capacitors, comprising a first electrode provided in the operation unit and a second electrode provided in a position of the casing opposite to the first electrode, one of first and second electrodes being divided into plural electrodes, and a detection unit that detects the moving direction and the moving amount of the operation unit based on capacitance changes of the plurality of capacitors, caused by parallel movement of the operation unit.

Further, it is preferable that, of the operation unit and the casing, the one having the electrode divided into plural electrodes has a common electrode that prevents change of capacitance formed between the other electrode and the common electrode even if the operation unit moves in parallel.

Further it is preferable that the signal generation means has a pillar body, having an end where the operation unit is provided, a plurality of detection sensors that detect direction and strength of a force applied to the pillar body and output signals in correspondence with the direction and the strength of the force, and a base to which the pillar body and the detection sensors are attached.

Further, the input device according to the present invention controls moving direction and moving amount of an object to be operated on an image display device, based on respective capacitance changes of two-dimensionally arranged capacitors.

Other features and advantages of the present invention will be apparent from the following description taken in conjunction with the accompanying drawings, in which like reference characters designate the same name or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will now be described in detail in accordance with the accompanying drawings. Note that the present invention is not limited to these embodiments.

Figure 1A:
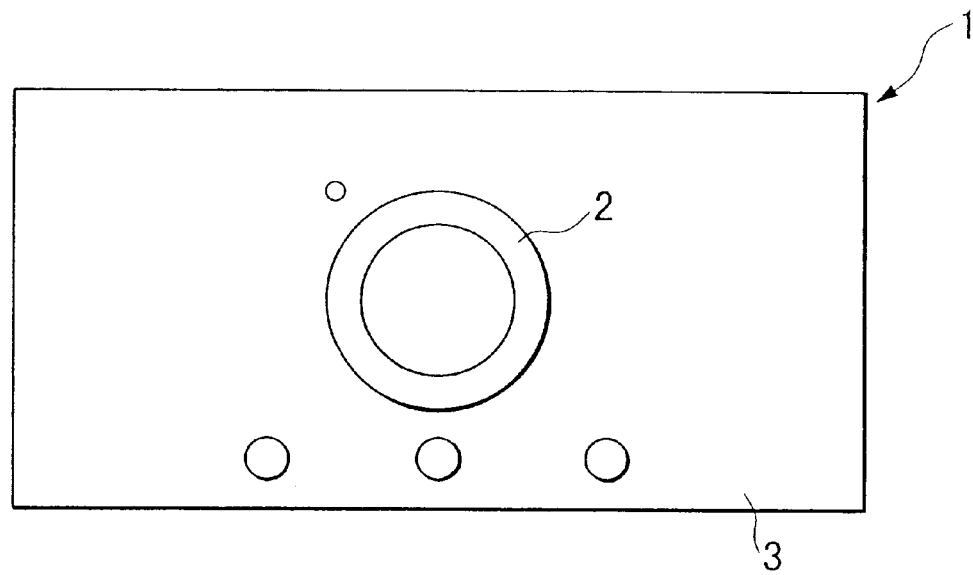
FIG. 1A is a top plan view showing an input device according to a first embodiment of the present invention.
Figure 1B:
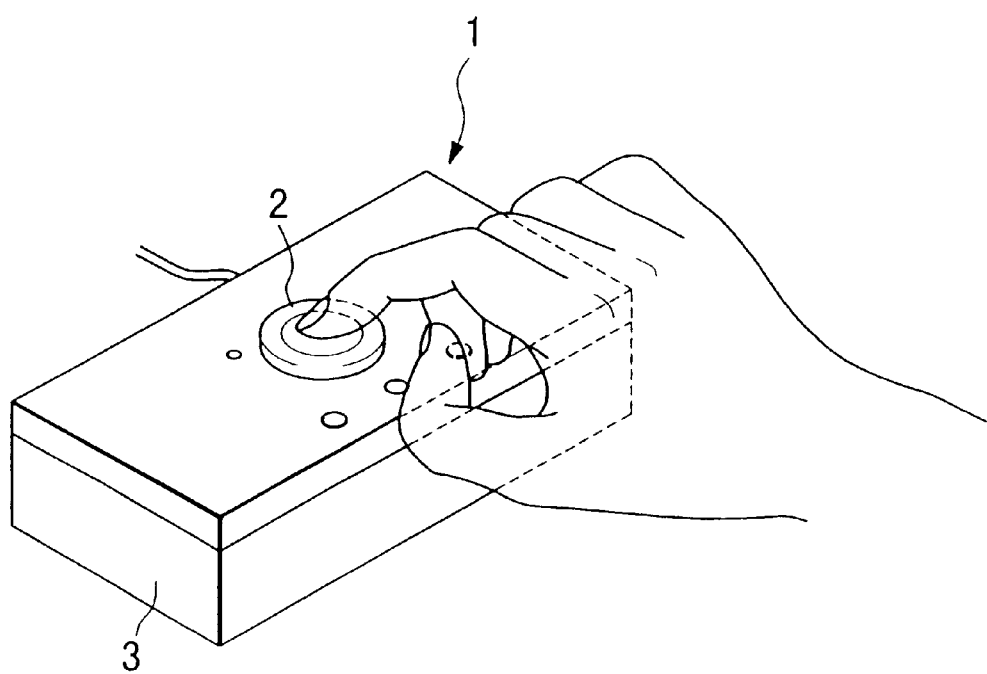
FIG. 1B is a perspective view showing a state where the input device is operated.
Figure 2:
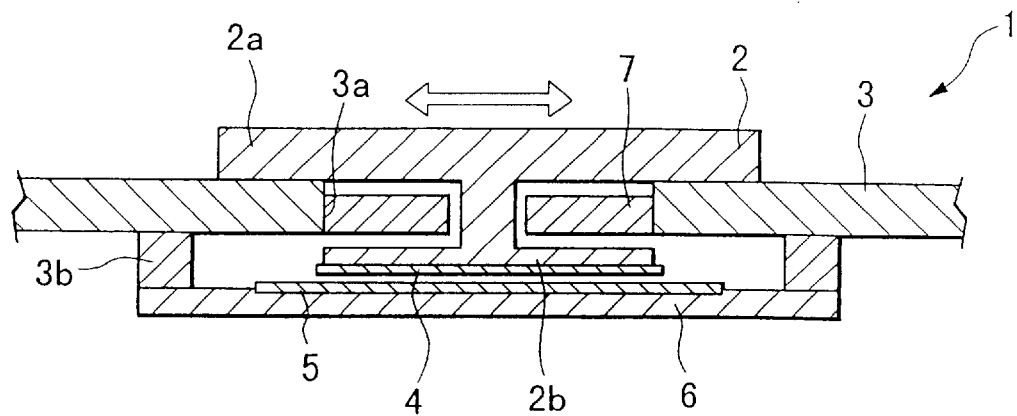
FIG. 2 is a partial cross-sectional view showing the input device according to the first embodiment.

FIGS. 1A and 1B show an input device according to an embodiment of the present invention. FIG. 1A is a top plan view of the input device, and FIG. 1B, a perspective view showing a state where the input device is operated. FIG. 2 is a partial cross-sectional view of the input device according to the first embodiment.

As shown in FIG. 2, an input device 1 schematically comprises an operation unit 2, a casing 3, an operation unit electrode 4 (first electrode), a printed board electrode 5 (second electrode), a printed board 6 and an elastic body 7.

An opening 3a is provided at the center of the casing 3 having a rectangular upper surface, and an operation unit 2 is inserted through the opening 3a. The operation unit 2 has two disks, namely, a large and a small disks connected to each other. As shown in FIG. 1B, an upper large disk 2a exposed on the top plate of the casing 3 is operated with a finger. The operation unit electrode 4 is formed on a lower surface of a lower small disk 2b. The printed board 6 is supported by a support 3b, below the opening 3a on the rear surface of the top plate of the casing 3. The printed board electrode 5 is formed on the printed board 6 to be opposed to the operation unit electrode 4. To prevent fall of the operation unit 2 and restore an initial state of the operation unit 2 when the operation unit 2 is not operated, the elastic body 7 is provided in the opening 3a of the casing 3.

Figure 3A:
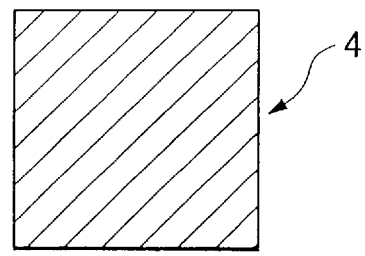
FIG. 3A is a schematic view showing an example of an operation unit electrode 4.
Figure 3B:
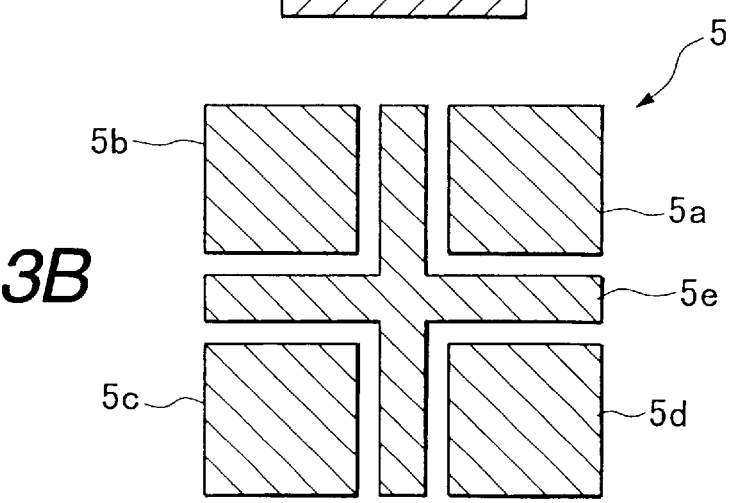
FIG. 3B is a schematic view showing an example of a printed board electrode 5.

FIG. 3A is a schematic view showing an example of the operation unit electrode 4. FIG. 3B is a schematic view showing an example of the printed board electrode 5. The operation unit electrode 4 is an approximately square-shaped plate type electrode. The printed board electrode 5 comprises four approximately square-shaped electrodes 5a to 5d and a cross-shaped common electrode 5e provided so as to divide the four electrodes 5a to 5d. The operation unit electrode 4 and the five electrodes of the printed board electrode 5 are arranged to be opposed to each other, with air as insulating body therebetween, forming total 5 capacitors.

Figure 4:
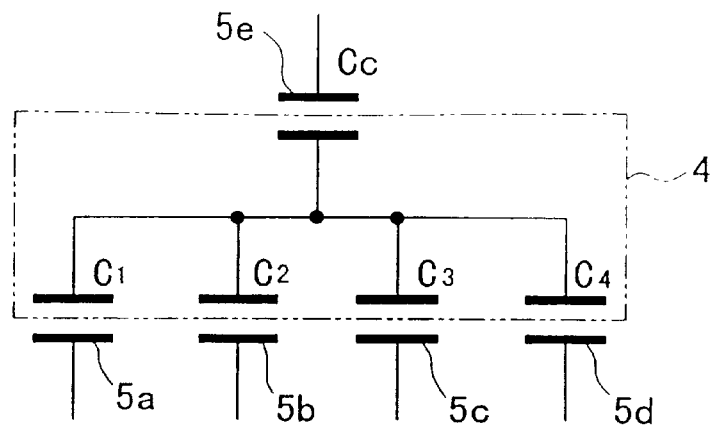
FIG. 4 is an equivalent-circuit diagram of electrodes in FIG. 3.

FIG. 4 shows the arrangement of the capacitors as an equivalent-circuit diagram. In FIG. 4, a block of alternate long and two short dashed line shows the operation unit 4. As shown in FIG. 4, the operation unit electrode 4 and the printed board electrode 5 construct five capacitors $C_1$ to $C_4$ and Cc.

The five capacitors and detectors (not shown) of the capacitors to detect respective capacitance changes construct signal generation means.

The capacitance of the respective capacitors change in correspondence with area ratio of the operation unit electrode 4 with respect to the five electrodes of the printed board electrode 5. By the capacitance changes, the moving direction and moving amount of the operation unit 2 are detected by the detectors, and a control signal to control the moving direction and moving amount of a cursor on an image display device is generated, based on the moving direction and moving amount of the operation unit 2.

Figure 5:
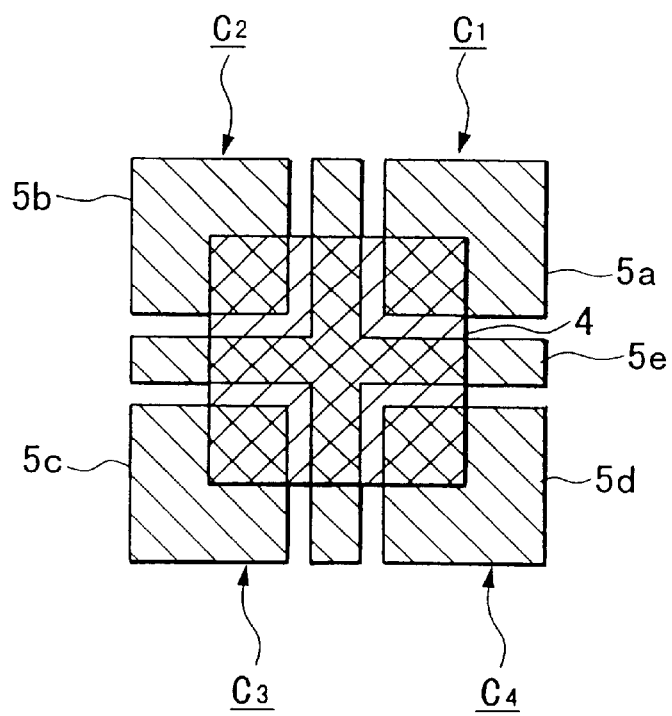
FIG. 5 is a schematic view showing the operation unit electrode 4 and the printed board electrode 5 before an operation unit 2 is moved.

FIG. 5 is a schematic view showing the operation unit electrode 4 and the printed board electrode 5 before the operation unit 2 is moved. As the operation unit 2 is in an initial position by the elastic body 7, and the four capacitors constructed with the electrodes 5a to 5d and the operation unit electrode 4 have the same electrode plate area, it is determined that the operation unit 2 has not been moved.

The moving amount of the operation unit 2 is obtained from the ratio between the capacitors $C_1+C_4$ to the capacitors $C_2+C_3$, and the moving amounts in a vertical direction in FIG. 5 is obtained from the ratio between the capacitors $C_1+C_2$ to the capacitors $C_3+C_4$. At this time, in the capacitor Cc constructed with the common electrode 5e and the operation unit electrode 4, as the electrode plate area does not change even when the operation unit 2 moves, the capacitance does not change.

Figure 6A:
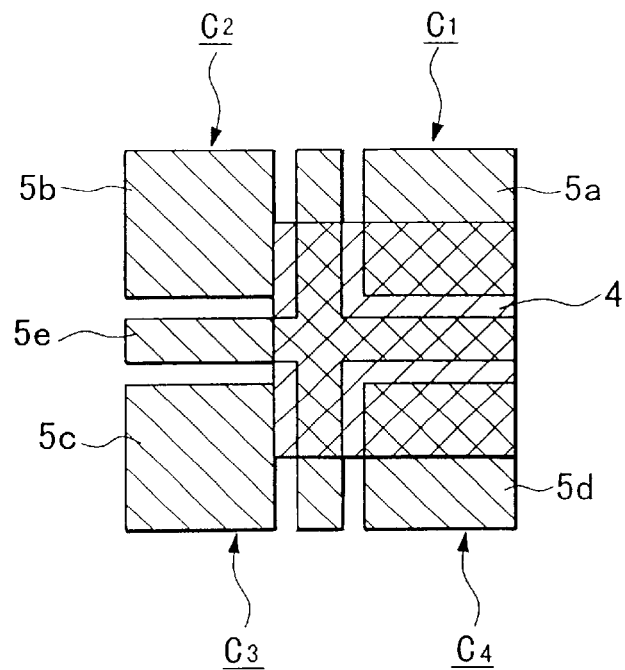
FIG. 6A is a schematic view showing a state where the operation unit 2 has moved to the rightmost position.

FIG. 6A is a schematic view showing a state where the operation unit 2 has moved to the rightmost position. In this case, the overlap area of the capacitors $C_1+C_4$ becomes the maximum (Cmax), while that of the capacitors $C_2+C_3$ becomes the minimum (Cmin). That is, it is determined that the operation unit 2 has moved to the rightmost position. Further, as the capacitors $C_1+C_2$ and the capacitors $C_3+C_4$ are equal to each other, it is determined that the operation unit 2 has not moved in the vertical direction.

Figure 6B:
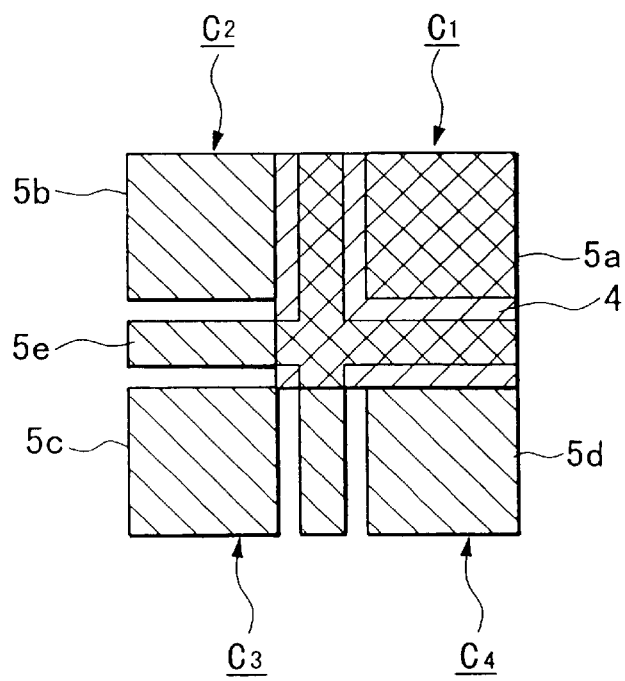
FIG. 6B is a schematic view showing a state where the operation unit 2 has moved to the upper-rightmost position.

FIG. 6B is a schematic view showing a state where the operation unit 2 has moved to the upper-rightmost position. In this case, as the overlap area of the capacitors $C_1+C_4$ is the maximum (Cmax), while that of the capacitors $C_2+C_3$ is the minimum (Cmin). That is, it is determined that the operation unit 2 has moved to the rightmost position. Similarly, $C_1+C_2$ is Cmax, while $C_3+C_4$ is Cmin. That is, it is determined that the operation unit 2 has moved to the uppermost position. Thus, it is determined that the operation unit 2 has moved upper-rightmost position.

Then moving direction and moving amount of an object to be operated on an image display device are controlled based on the obtained moving direction and moving amount of the operation unit 2.

The input device according to the first embodiment has the following advantages. That is, as shown in FIG. 1B, the operation unit 2 can be moved by operation with a finger, in an operated direction. Further, as the operation unit 2 moves while pressing the elastic body 7, the operation unit 2 receives a reaction from the elastic body 7 in accordance with the moving amount of the operation unit 2. Accordingly, the input device 1 provides excellent operability and reaction to the user, and the device can be easily operated. Further, as the capacitance changes of the four capacitors $C_1$ to $C_4$ are detected as moving direction and moving amount of the operation unit 2, the device can be further thinned. Further, the electrode 5a to 5d and the common electrode 5e are arranged on the same plane, and a capacitor Cc with capacitance which does not change even when the operation unit 2 moves is provided, wiring is not required in the electrode 4 on the operation unit 2 side. Further, the input device according to the first embodiment can be used as a cross key. Further, the input device provides operability more excellent than that in the cross key regarding operation in a diagonal direction and the like.

Next, the input device according to a second embodiment will be described.

Figure 7:
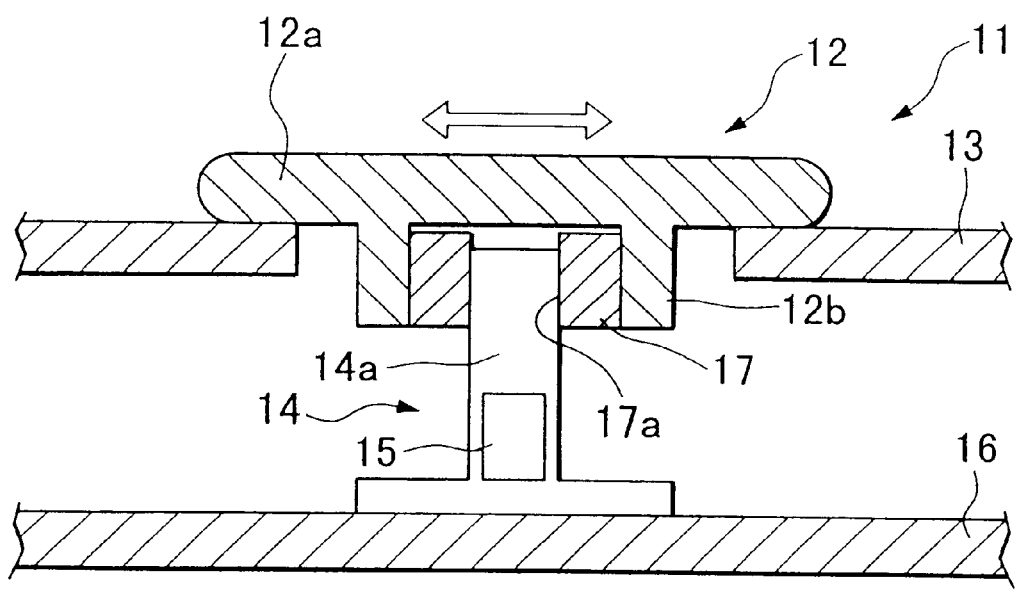
FIG. 7 is a partial cross-sectional view showing the input device according to a second embodiment of the present invention.

FIG. 7 is a partial cross-sectional view showing the input device according to the second embodiment of the present invention. The input device 1 schematically comprises an operation unit 12, a casing 13, a pillar body 14, detection sensors 15, a base 16 and an elastic body 17.

The operation unit 12 attached to the opening of the casing 13 has a disk 12a with a cylindrical member 12b projected from the lower surface thereof. An upper surface of the disk 12a is operated with a finger. The pillar body 14 having a prism shape is provided on the base 16. The pillar body 14 has a pillar 14a holding four detection sensors 15 on lower ends of respective side surfaces. The sensors 15 such as distortion sensors and resistance sensors detect the direction and strength of a force applied to the pillar 14a and output signals corresponding to the detected direction and strength of the force. The cylindrical member 12b includes the elastic body 17. The elastic body 17 has, at its center, a hole 17a to be engaged with the distal end of the pillar 14a.

Hereinbelow, the operation of the input device according to the second embodiment will be described.

In the input device in FIG. 7, the operation unit 12 is moved with a finger, then a force is applied via the elastic body 17 to the pillar body 14. The detection sensors 15 operate by the applied force, detect the direction and strength of the force applied to the pillar body 14, and output signals corresponding to the detected direction and strength. By this operation, a cursor and the like on a display of an electronic device connected to the input device 11 can be moved. At this time, the pillar 14a is merely slightly distorted, however, the operation unit 12 moves in the direction of the application of force by contraction of the elastic body 17. When the force applied to the operation unit 12 is released, the contracted elastic body 17 restore its original shape, and the operation unit 12 returns to the initial position.

The input device according to the second embodiment has the following advantages. That is, as the operation unit 12 moves in correspondence with manipulation with a finger in an operated direction, and further, the operation unit 12 moves while pressing the elastic body 17, a reaction corresponding to the moving amount of the operation unit 12 is applied from the elastic body 17 to the operation unit 12. Accordingly, the input device 11 provides excellent operability and reaction to the user, and the input device 11 can be easily operated. Further, the input device according to the second embodiment can be used as a cross key. Further, the input device provides better operability than that in the cross key regarding operation in a diagonal direction and the like.

Note that the scope of technique of the present invention is not limited to the above embodiments but various changes can be added without departing from the subject matter of the present invention. In the above first embodiment, five capacitors are formed by providing the operation unit electrode 4 as one plate of electrode and the printed board electrode 5 as a set of divided electrodes. However, it may be arranged such that the operation unit electrode is divided into a plurality of electrodes, and the printed board electrode is provided as one plate of electrode.

As described above, in the input device of the present invention, the operation unit moves in accordance with operation with a finger in an operated direction. Further, as the operation unit moves while pressing the elastic body, a reaction corresponding to the moving amount of the operation unit is applied from the elastic body to the operation unit. Thus, the input device provides excellent operability and reaction to a user, and the input device can be easily operated.

Further, the input device has a simple construction, and it can be thinned and/or downsized.

As many apparently widely different embodiments of the present invention can be made without departing from the spirit and scope thereof, it is to be understood that the invention is not limited to the specific embodiments thereof except as defined in the appended claims.

What is claimed is:

1. An input device comprising:

a casing having an opening in an upper surface thereof;

an operation unit inserted into and passed through said opening of said casing and supported to be movable in parallel in a direction along said upper surface of said casing, said operation unit having an operation disk placed on said upper surface of said casing, an electrode supporting plate disposed in said casing, and a connecting member interconnecting said operation disk and said electrode supporting plate;

an elastic member for use in recovering said operation unit back to its initial position when said operation unit is not operated; and signal generation means for detecting a moving direction and a moving amount of said operation unit, and generating a control signal for controlling a moving direction and a moving amount of an object to be operated on an image display device, in accordance with the detected moving direction and moving amount of said operation unit, wherein said signal generation means comprises a first electrode provided on a lower surface of said electrode supporting plate of said operation unit, and a second electrode fixedly provided in a position within said casing so as to oppose said first electrode across an air gap, one of said first and second electrodes being divided into plural electrodes having the same area, this divided area being formed with a common electrode showing no variation in capacitance even if said operation unit performs parallel movement, the first and second electrodes constituting a plurality of capacitors, and there is provided a detection unit that detects the moving direction and the moving amount of said operation unit based on capacitance changes of each of said plurality of capacitors caused by parallel movement of said operation unit.

* * * * *